United States Patent [19]

Frisch et al.

[11] 4,096,128

[45] Jun. 20, 1978

[54] POLYURETHANE ELASTOMER PRODUCED BY REACTION BETWEEN A TRIAZOLE-STABILIZED ISOCYANATE PREPOLYMER AND A DIAMINE

[76] Inventors: Kurt C. Frisch, 17986 Parke La., Grosse Ile, Mich. 48138; Adolfas Damusis, 25830 Forestview Dr., Southfield, Mich. 48034

[21] Appl. No.: 774,036

[22] Filed: Mar. 3, 1977

[51] Int. Cl.$^2$ .............................................. C08G 18/10
[52] U.S. Cl. ..................... 260/77.5 SS; 260/45.8 N; 260/77.5 AT; 260/77.5 AM
[58] Field of Search ............... 260/77.5 SS, 77.5 AT, 260/77.5 AM, 45.8 N

[56] References Cited

U.S. PATENT DOCUMENTS

| | | | |
|---|---|---|---|
| 3,213,058 | 10/1965 | Boyle et al. ................... | 260/77.5 SS |
| 3,379,675 | 4/1968 | Jensen et al. .................. | 260/77.5 SS |
| 3,642,813 | 2/1972 | Kirchmayr et al. .......... | 260/77.5 SS |
| 3,721,645 | 3/1973 | Zemlin .......................... | 260/77.5 TB |
| 3,947,426 | 3/1976 | Lander ......................... | 260/77.5 TB |

*Primary Examiner*—M. J. Welsh
*Attorney, Agent, or Firm*—John C. Purdue

[57] ABSTRACT

A method for producing a urethane elastomer is disclosed. The method involves mixing benzotriazole or a tolyl triazole with an isocyanate terminated prepolymer while the prepolymer is at a temperature sufficiently high that it is a liquid. The proportion of benzotriazole or tolyl triazole used can range from 0.1 to 1.0 equivalent per equivalent of isocyanate in the prepolymer, and must be sufficient to increase the pot life of a mixture of the prepolymer with a diamine, but insufficient to cause substantial impairment of the physical properties of the cured elastomer. A substantially equivalent amount of a diamine is then mixed with the stabilized prepolymer, and the resulting composition is heated to produce the elastomer.

7 Claims, No Drawings

POLYURETHANE ELASTOMER PRODUCED BY REACTION BETWEEN A TRIAZOLE-STABILIZED ISOCYANATE PREPOLYMER AND A DIAMINE

BACKGROUND OF THE INVENTION

Urethane elastomers are produced in large quantities from various isocyanate terminated prepolymers by reaction with a hindered diamine. Historically, 4,4'-methylene bis (o-chloroaniline) (hereinafter "MOCA") has probably been the most widely used hindered amine. However, MOCA is a carcinogen suspect agent, and, as a consequence, taking the necessary safety precautions to safeguard the health of workers substantially increases the cost involved in producing elastomers using MOCA as the hindered amine. Another hindered amine that has also seen considerable use is 4,4'-methylene bis (methyl-anthranilate) (hereinafter "MBMA").

So far as is known, unhindered diamines have not heretofore been used for reaction with an isocyanate terminated prepolymer to produce an elastomer. Pot life is short, only a few minutes, even when MOCA and MBMA are used as the diamines. In a recent experiment wherein an attempt was made to produce a urethane elastomer from an isocyanate terminated prepolymer and an unhindered diamine the pot life was estimated to be five seconds; the specific unhindered diamine used was 4,4'-methylene dianiline (hereinafter "MDA").

BRIEF DESCRIPTION OF THE INSTANT INVENTION

The present invention is based upon the discovery that an isocyanate terminated prepolymer can be stabilized by reaction with benzotriazole* or a tolyl triazole, and that a mixture of the stabilized prepolymer with a diamine has a longer pot life than does a mixture of the unstabilized prepolymer with that diamine. When a hindered diamine is used in producing a urethane elastomer according to the invention, e.g. MOCA or MBMA, the pot life is increased substantially so that the labor required for carrying out the mixing operation can be minimized, and the prepolymer is preferably stabilized with from 0.1 to 0.5 equivalent of the triazole per equivalent of isocyanate in the prepolymer. On the other hand, when the diamine is unhindered, urethane elastomers which, so far as is known, had not been made are the result of practicing the instant invention, and it is usually preferred that the prepolymer be stabilized with from 0.5 to 1.0 equivalent of the triazole per equivalent of isocyanate in the prepolymer.

*The use of triazoles to stabilize urethane powder coating compositions is suggested in U.S. Pat. No. 3,721,645. Other blocking agents for urethanes, e.g. phenol, gamma-butyrolactam and dimethylmalonate are also known; see, for example, U.S. Pat. No. 3,947,426.

DETAILED DESCRIPTION OF THE PREFERRED EMBODIMENTS

The following Examples, which are presented solely for the purpose of illustrating and disclosing the invention, set forth the best presently known mode.

EXAMPLE 1

An isocyanate-terminated prepolymer was prepared from 1 mole of a poly(oxytetramethylene)glycol having a molecular weight of 1000 and a melting temperature of 50° C. (hereinafter "PTMG 1000") and 2 moles of tolylene diisocyanate (hereinafter "TDL"). The specific TDL used was an 80/20 blend of 2,4- and 2,6-isomers. The isocyanate (hereinafter "NCO") content of the prepolymer, determined by di-n-butyl amine titration, was 6.2 percent. Benzotriazole (hereinafter "BT") was then melted, vacuum degassed, and mixed with a sample of the prepolymer which had been preheated to 75° C. The BT was added in the proportion of 0.25 equivalent (mole) thereof per isocyanate equivalent of the prepolymer. The resulting mixture was stirred at 80° C. for 1 hour to insure complete reaction between the BT and the free NCO groups of the prepolymer. The stabilized prepolymer which resulted, at 80° C., was mixed with MBMA, which had been vacuum degassed at 150° C., mixing temperature 140° C., at an NCO: $NH_2$ ratio of substantially 1:1. The resulting composition was found to have a pot life of 20 minutes at 100° C.; it was vacuum degassed and poured into a mold preheated to 100° C. The mold, which had a central cavity 6 inches by 6 inches by 0.06 inch in depth, was then covered by a flat plate and placed in a hydraulic press where a compressive force of 10,000 pounds per square inch was applied to the mold and plate. After approximately one hour in the mold at 100° C. the partially cured elastomer was removed from the mold and transferred to an oven where it was cured for an additional 19 hours at 100° C.

After conditioning at room temperature and 50 percent relative humidity for one week the elastomer was found to have the following physical properties:

| | Test Procedure | |
|---|---|---|
| 100% modulus, pounds per square inch, | ASTM-D-412 | 1260 |
| 300% modulus, pounds per square inch, | | 2500 |
| Tensile strength, pounds per square inch, | | 4380 |
| Elongation at break, percent | | 440 |
| Shore hardness A | ASTM-D-2240 | 92 |
| Shore hardness D | | 47 |
| Graves tear strength, pounds per inch | ASTM-D-624 | 400 |
| Bashore rebound, percent | Bashore rebound tester | 248 / 24 |
| Thermal degradation, ° C. 2 percent | duPont 950 Thermogravimetric Analyzer | 250 |
| Thermal degradation, ° C. 10 percent | | 305 |

Other urethane elastomers according to the invention, and controls in which no triazole was used, have been produced by the method described above in Example 1. The starting materials used, the ratio of equivalents of triazole used to equivalents of NCO, the mixing temperatures, the curing conditions, the pot life and the physical properties of the various elastomers, determined by the tests identified above, are set forth in Table 1, below. The following abbreviations, all used in Table 1, have the indicated meanings:

PTMG 650: A poly (oxytetramethylene)glycol

-continued having a molecular weight of 650 and a melting point of 30° C.

for each elastomer. In each case, the prepolymer was produced by reacting two moles of the indicated isocyanate with one mole of the polyol.

TABLE 1

| Example | Polyol | Isocyanate | Triazole | Diamine | Triazole/NCO Equivalent | Mixing Temperature, ° C. Prepolymer + Triazole | Diamine + Prepolymer |
|---|---|---|---|---|---|---|---|
| 2 | PTMG 1000 | TDI | BT | MBMA | 0.50 | 80 | 140 |
| Control* (1,2) | PTMG 1000 | TDI | None | MBMA | — | — | 140 |
| 3 | PTMG 1000 | TDI | TT | MBMA | 0.25 | 90 | 140 |
| 4 | PTMG 1000+ PTMG 650** | TDI | TT | MBMA | 0.25 | 90 | 120 |
| 5 | PTMG 1000 | TDI | TT | MOCA | 0.25 | 80 | 110 |
| Control*(5) | PTMG 1000 | TDI | None | MOCA | — | — | 110 |
| 6 | PTMG 1000 | TDI | TT | MOCA | 0.25 | 80 | 110 |
| 7 | PTMG 1000 | TDI | TT | MDA | 0.5 | 60 | 90 |
| Control*(7) | PTMG 1000 | TDI | None | MDA | — | — | 90 |
| 8 | MTMG 1000 | TDI | TT | MDA | 1.0 | 60 | 90 |
| 9 | PTMG 1000 | TDI | BT | m-PDA | 0.5 | 40 | 70 |
| 10 | PTMG 1000 | $H_{12}MDI$ | BT | m-PDA | 0.27 | 90 | 80 |
| 11 | PPG | $H_{12}MDI$ | TT | 1,3 BAC | 0.5 | 60 | 25 |
| 12 | PPG | $H_{12}MDI$ | TT | MXDA | 0.5 | 60 | 25 |
| 13 | PPG | $H_{12}MDI$ | TT | IPDA | 0.5 | 60 | 25 |
| 14 | PPG | $H_{12}MDI$ | TT | IPDA | 1.0 | 60 | 25 |

*Not according to the present invention; presented for purposes of comparison with example(s) in parentheses.
**Equimolecular proportions.

| Example | Cure Conditions Time (hrs) | Temp (° C.) | Pot Life Min/° C. | 100% Modulus, Psi | 300% Modulus, Psi | Tensile Strength Psi | Elongation at Break, % | Shore Hardness A | D |
|---|---|---|---|---|---|---|---|---|---|
| 2 | 20 | 100 | 30/100 | 1200 | 1900 | 3050 | 460 | 92 | 45 |
| Control*(1,2) | 20 | 100 | 4/100 | 2022 | | 4043 | 231 | 94 | 50 |
| 3 | 20 | 100 | 22/140 | 1667 | 2318 | 4263 | 360 | 92 | 46 |
| 4 | 20 | 110 | 30/120 | 770 | 2283 | 4650 | 378 | 88 | 45 |
| 5 | 20 | 100 | 9/110 | 1745 | 2740 | 4820 | 479 | 93 | 45 |
| Control*(5) | 20 | 100 | 4/110 | 1987 | 3465 | 4871 | 383 | 96 | 55 |
| 6 | 3 | 125 | 10/110 | 1700 | 2400 | 4600 | 488 | 94 | 48 |
| 7 | 3 | 125 | 3/90 | 1126 | 1824 | 4500 | 520 | 95 | 46 |
| Control*(7) | — | — | 5 sec/90** | — | — | — | — | — | — |
| 8 | 2.5 | 125 | 15/90 | 650 | 1000 | 3020 | 640 | 87 | 35 |
| 9 | 20 | 100 | 4/50 | 924 | 1389 | 4151 | 600 | 92 | 43 |
| 10 | 22 | 110 | 0.5/80 | 690 | 1380 | 3070 | 515 | 78 | 36 |
| 11 | 3 | 100 | 0.5/60 | 573 | 1650 | 3679 | 462 | 72 | ND*** |
| 12 | 18 | 100 | 0.5/60 | 380 | 1216 | 3369 | 508 | 71 | ND |
| 13 | 19 | 100 | 0.5/60 | 636 | 2419 | 4019 | 390 | 74 | ND |
| 14 | 18 | 90 | 1/60 | 419 | 1201 | 2957 | 485 | 74 | ND |

*Not according to the present invention; presented for purposes of comparison with example(s) in parentheses.
**The pot life was too short for processing.
***Not determined.

| Example | Graves Tear Strength, pi | Rebound, % | TGA, ° C. 2% | 10% |
|---|---|---|---|---|
| 2 | 400 | 29 | 225 | 296 |
| Control*(1,2) | 364 | ND** | 250 | 295 |
| 3 | 388 | ND | ND | ND |
| 4 | 370 | ND | ND | ND |
| 5 | 462 | ND | ND | ND |
| Control*(5) | 489 | ND | ND | ND |
| 6 | 480 | ND | ND | ND |
| 7 | 390 | ND | ND | ND |
| Control*(7) | — | — | — | — |
| 8 | 410 | ND | ND | ND |
| 9 | 392 | ND | ND | ND |
| 10 | | ND | ND | ND |
| 11 | 247 | ND | 240 | 312 |
| 12 | 187 | ND | 240 | 322 |
| 13 | 270 | ND | 235 | 309 |
| 14 | 203 | ND | 235 | 305 |

*Not according to the present invention; presented for purposes of comparison with example(s) in parentheses.
**Not determined.

| | |
|---|---|
| PPG 1010: | A poly(oxypropylene)glycol having a molecular weight of 1030. |
| $H_{12}$ MDI: | 4,4'-dicyclohexylmethane diisocyanate |
| m-PDA: | m-phenylene diamine |
| 1,3-BAC: | 1,3-bis(aminomethyl)cyclohexane |
| MXDA: | m-xylylene diamine |
| IPDA: | isophorone diamine |
| TT: | toyltriazole; the material used was a blend of approximately equal parts of 4-methylbenzotriazole and 5-methylbenzotriazole |

The curing was for approximately 1 hour in a mold at the temperature reported in Table 1 followed by oven curing at that temperature for the remainder of the time

EXAMPLES 15–17

Substantially the procedure described above in Example 1, except that the prepolymer:diamine blend was merely poured into a pan mold after degassing, was used to produce urethane elastomers according to the method of the invention from a prepolymer made from TDL and a polyester which was hydroxy-terminated. The specific prepolymer had an NCO content of approximately 3.5 percent by weight; it is commercially available under the trade designation "Vibrathane 6025". Data concerning the elastomers are set forth in Table 11, below:

TABLE 11

| Example | Triazole | Diamine | Triazole/NCO Equivalent | Mixing Temperature °C. Diamine + Prepolymer |
|---|---|---|---|---|
| 15 | TT | MOCA | 0.5 | 100 |
| 16 | TT | MDA | 1.0 | 100 |
| 17 | TT | m-PDA | 1.0 | 100 |
| Control*(15) | — | MOCA | — | 100 |

*Not according to the present invention; presented for purposes of comparison with the example in parentheses.

| Example | Cure Conditions Time(hrs) | Cure Conditions Temp(° C.) | Pot Life Min/° C. | Tensile Strength Psi | Elongation at Break, % | Shore Hardness A |
|---|---|---|---|---|---|---|
| 15 | 16 | 107 | 13 | 3760 | 550 | 80 |
| 16 | 16 | 107 | 9 | 3210 | 590 | 78 |
| 17 | 16 | 107 | 9 | 3870 | 600 | 80 |
| Control*(15) | 16 | 100 | 7 | 3640 | 685 | 80 |

*Not according to the present invention; presented for purposes of comparison with example(s) in parentheses.

It is known e.g., in U.S. Pat. No. 3,721,645, that triazoles other than BT and TT are capable of reaction with NCO groups, and that the reaction is reversible in the sense that apparently normal cure occurs at an elevated temperature. It will be apparent that an equivalent amount of any of the other triazoles could be substituted for BT and TT in each of the foregoing Examples, and with similar results. However, BT and TT are the preferred triazoles because of availability, low volatility, anti-corrosive properties and price.

The curing times reported in the foregoing Examples are those which were actually used. It has been found, however, that the 18 to 20 hour curing times used in many instances are unnecessary in the sense that substantially the same physical properties result after a shorter cure. In most cases, a cure time of three to six hours has been found to be adequate.

Various changes and modifications can be made, as will be apparent to one skilled in the art, from the specific embodiments described above without departing from the spirit and scope of the invention as defined in the following claims:

What we claim is:

1. A method for producing a urethane elastomer from an isocyanate prepolymer and a diamine reactive therewith to produce the elastomer, said method comprising producing a stabilized prepolymer by mixing therewith while at a temperature sufficiently high that the prepolymer is a liquid, from 0.1 to 1.0 equivalent per equivalent of NCO in the prepolymer, of a triazole selected from the group consisting of 1,2,3-benzotriazole, 1,2,3-tolyltriazoles and mixtures thereof, with the proviso that the amount of triazole mixed with the prepolymer is sufficient to increase the pot life of a mixture of the prepolymer with the diamine but insufficient to cause substantial impairment of the physical properties of the cured elastomer, mixing a substantially equivalent amount of the diamine with the stabilized prepolymer, and heating the resulting composition to produce the elastomer.

2. A urethane elastomer produced by the method of claim 1.

3. A urethane elastomer as claimed in claim 2 wherein the unhindered diamine is 4,4'-methylene dianiline.

4. A urethane elastomer as claimed in claim 2 wherein the unhindered diamine is m-phenylene diamine.

5. A urethane elastomer as claimed in claim 2 wherein the unhindered diamine is 1,3-bis(amino-methyl) cyclohexane.

6. A urethane elastomer as claimed in claim 2 wherein the unhindered diamine is m-xylylene diamine.

7. A urethane elastomer as claimed in claim 2 wherein the unhindered diamine is isophorone diamine.

* * * * *

UNITED STATES PATENT AND TRADEMARK OFFICE
CERTIFICATE OF CORRECTION

PATENT NO. : 4,096,128
DATED : June 20, 1978
INVENTOR(S) : Kurt C. Frisch and Adolfas Damusis It is certified that error appears in the above-identified patent and that said Letters Patent are hereby corrected as shown below:

Between "[76] Inventors: Kurt C. Frisch, 17986 Parke La., Grosse Ile, Mich. 48138; Adolfas Damusis, 25830 Forestview Dr., Southfield, Mich. 48034"

and "[21] Appl. No.: 774,036

- [73] Assignee: The Sherwin-Williams Company, Toledo, Ohio - should be inserted.

Signed and Sealed this

Ninth Day of January 1979

[SEAL]

Attest:

RUTH C. MASON
Attesting Officer

DONALD W. BANNER
Commissioner of Patents and Trademarks